United States Patent [19]

Blosser et al.

[11] Patent Number: 5,453,263
[45] Date of Patent: Sep. 26, 1995

[54] HALIDE-FREE PROCESS FOR THE SYNTHESIS OF ETS-10

[75] Inventors: Patrick W. Blosser, East Windsor; Steven M. Kuznicki, Whitehouse Station, all of N.J.

[73] Assignee: Engelhard Corporation, Iselin, N.J.

[21] Appl. No.: 248,040

[22] Filed: May 24, 1994

[51] Int. Cl.$^6$ ..................................................... C01B 33/34
[52] U.S. Cl. ........................... 423/713; 423/709; 423/718
[58] Field of Search ...................................... 423/700, 709, 423/718, 713

[56] References Cited

U.S. PATENT DOCUMENTS

| | | | |
|---|---|---|---|
| 4,707,345 | 11/1987 | Lok et al. | 423/713 |
| 4,853,202 | 8/1989 | Kuznicki | 423/326 |
| 4,994,191 | 2/1991 | Kuznicki et al. | 210/688 |
| 5,011,591 | 4/1991 | Kuznicki | 208/46 |
| 5,160,717 | 11/1992 | Lok et al. | 423/704 |
| 5,208,006 | 5/1993 | Kuznicki et al. | 423/713 |
| 5,244,650 | 9/1993 | Kuznicki et al. | 423/718 |

*Primary Examiner*—Mark L. Bell
*Assistant Examiner*—David Samae

[57] ABSTRACT

A novel process for the preparation of a crystalline titanium molecular sieve zeolite identified as ETS-10 characterized by crystals of uniform morphology which is free from halide-containing reactants is disclosed.

7 Claims, 2 Drawing Sheets

HALIDE-FREE PROCESS FOR THE SYNTHESIS OF ETS-10

BACKGROUND OF THE INVENTION

1. Field of the Invention

This invention relates to a novel process for the preparation of ETS-10 which is a large pore crystalline titanium molecular sieve zeolite described and claimed in U.S. Pat. No. 4,853,202.

It also relates to a novel form of ETS-10 wherein the individual crystals are characterized by a uniform morphology.

SUMMARY OF THE INVENTION

The present invention eliminates the use of halide reactants which have previously been employed in the preparation of ETS-10 thereby resulting in a broader choice with regard to reaction vessels as well as the production of a product which has a uniform crystal size which is controlled by seeding techniques utilizing ETS-10 as the source of seeds.

DETAILED DESCRIPTION OF THE INVENTION

Figure 1A:
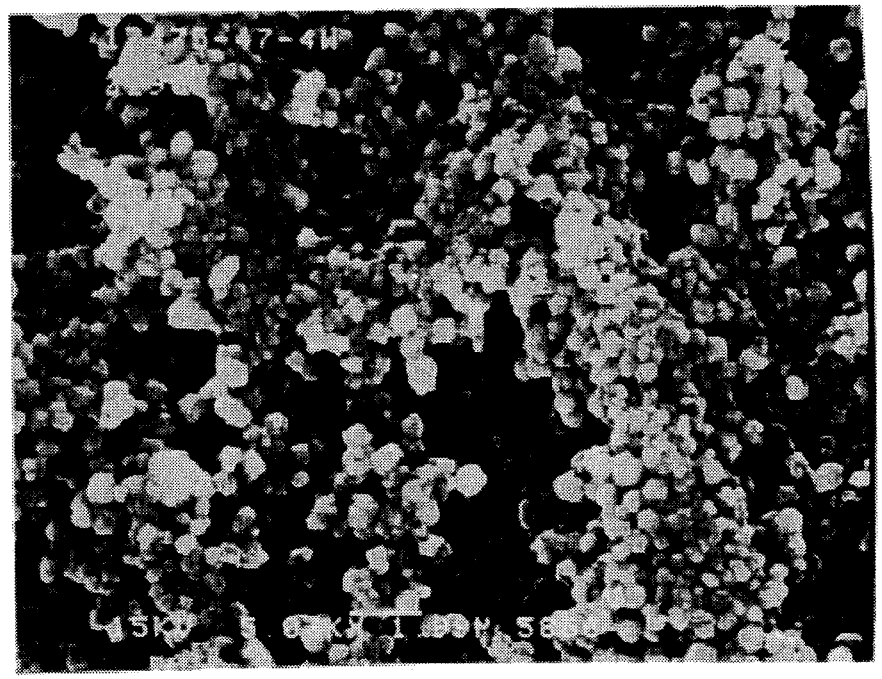
FIGS. 1A and 1B contain two scanning electron micrographs at two different magnifications of the product of Example 1.

The present invention is directed towards crystalline titanium molecular sieve zeolites which have a pore size of approximately 8 Angstrom units and have a titania-to-silica mole ratio in the range of from 2.5 to 25.

ETS-10 molecular sieves are disclosed and claimed in U.S. Pat. No. 4,853,202, the entire disclosure of which is incorporated herein by reference, and have a crystalline structure and an X-ray powder diffraction pattern having the following significant lines:

TABLE 1

| XRD Powder Pattern of ETS-10 (0–40° theta) | |
|---|---|
| Significant d-Spacing (Angs.) | $I/I_o$ |
| 14.7 ± .35 | W–M |
| 7.20 ± .15 | W–M |
| 4.41 ± .10 | W–M |
| 3.60 ± .05 | VS |
| 3.28 ± .05 | W–M |

In the above table:
VS=60–100
S=40–60
M=20–40
W=5–20

The above values were determined by standard techniques. The radiation was the K-alpha doublet of copper, and a scintillation counter spectrometer was used. The peak heights, I, and the positions as a function of 2 times theta, where theta is the Bragg angle, were read from the spectrometer chart. From these, the relative intensities, 100 $I/I_o$, where $I_o$ is the intensity of the strongest line or peak, and d (obs.), the interplanar spacing in A, corresponding to the recorded lines, were calculated. It should be understood that this X-ray diffraction pattern is characteristic of all the species of ETS compositions. Ion exchange of the sodium ions and potassium ions with cations reveals substantially the same pattern with some minor shifts in interplanar spacing and variation in relative intensity. Other minor variations can occur depending on the silicon to titanium ratio of the particular sample, as well as if it had been subjected to thermal treatment. Various cation exchanged forms of ETS have been prepared and their X-ray powder diffraction patterns contain the most significant lines set forth in Table 1.

U.S. Pat. No. 4,853,202 discloses a method for the preparation of ETS-10 wherein corrosive halides, i.e., chlorides and/or fluoride reactants, are utilized. Current commercial methods for synthesis require the use of costly titanium or Hastelloy® vessels for crystallization. Eliminating the halides from the reactants would enable synthesis to be conducted in more readily available and less costly vessels thereby resulting in reduction of capital investment.

The expression "halide-free" as used in the specification and claims is intended to mean no deliberate addition of halide. However, very minor amounts of halide may be present due to the presence of impurity levels in the reagents employed.

As pointed out at col. 5, line 20, of U.S. Pat. No. 4,853,202, the titanium oxide source is a trivalent compound such as titanium trichloride. In addition, an alkali metal fluoride is usually included in the crystallization mixture, i.e., see col. 4, line 43, although the patent makes it clear that such is not necessary, i.e., see Example 6 of U.S. Pat. No. 4,853,202.

ETS-10 molecular sieves as prepared in accordance with the novel process of this invention is crystallized from a reaction mixture containing a non-halide titanium source such as titanic sulfate. Other sources of titanium, such as titanium oxysulfate and titanium alkoxides can be used. It is preferred that the titanium be in the tetravalent state as opposed to the trivalent state.

The instant invention prepares ETS-10 by forming a reaction mixture containing a halide-free source of titanium, e.g., such as titanic sulfate, a source of silica, a source of alkalinity, such as an alkali metal hydroxide and water, having a composition in terms of mole oxides of ratios falling within the following ranges

TABLE 2

| | Broad | Preferred | Most Preferred |
|---|---|---|---|
| $SiO_2/Ti$ | 2–20 | 3–10 | 4–7 |
| $H_2O/SiO_2$ | 2–200 | 5–100 | 10–50 |
| $M_n/SiO_2$ | .05–10 | .2–5 | .5–3 | wherein M indicates the cations of valence n derived from the alkali metal hydroxide and/or halide-free alkali metal salts used for preparing the titanium silicate according to the invention. The reaction mixture is heated to a temperature of from about 100° C. to 300° C. or more for a period of time ranging from about 1 hour to 40 days, or more. The hydrothermal reaction is carried out until crystals are formed and the resulting crystalline product is thereafter separated from the reaction mixture, cooled to room temperature, filtered and water washed. The reaction mixture can be stirred although it is not necessary. It has been found that when using gels, stirring is unnecessary but can be employed. When using sources of titanium which are solids, stirring is beneficial. The preferred temperature range is 150° C. to 250° C. for a period of time ranging from about 1 hour to 4 days. Crystallization is performed in a continuous or batchwise manner under autogenous pressure in an autoclave, static bomb reactor or flow-through reactor. Following the water washing step, the crystalline ETS may be dried at temperatures of 60° to 800° F. or more for periods up to 30 hours.

The method of preparing ETS compositions comprises the preparation of a reaction mixture constituted by sources of silica, sources of titanium, sources of alkalinity such as sodium and/or potassium oxide and water having a reagent molar ratio composition as set forth in Table 2.

The silica source includes most any reactive source of silicon such as silica, silica hydrosol, silica gel, silicic acid, alkoxides of silicon, alkali metal silicates, preferably sodium or potassium, or mixtures of the foregoing.

As previously pointed out, the titanium oxide source is preferably a tetravalent titanium compound such as titanic sulfate. In any event, no halides are utilized.

The source of alkalinity is preferably an aqueous solution of an alkali metal hydroxide, such as sodium hydroxide, which provides a source of alkali metal ions for maintaining electrovalent neutrality and controlling the pH of the reaction mixture within the range of 8.5 to 12.0. The alkali metal hydroxide serves as a source of sodium oxide which can also be supplied by an aqueous solution of sodium silicate.

It is preferred that the crystallization gel mixture contain seeds of ETS-10 which serve to improve the rate of crystallization.

The amount of seeds added range from about 0.01 to about 150 pounds of seed/1,000 pounds of gel. The particle size of the seed determines the actual amount added with a greater amount being added with larger particle size seeds.

The crystalline titanium silicate as synthesized can have the original components thereof replaced by a wide variety of others according to techniques well known in the art. Typical replacing components would include hydrogen, ammonium, alkyl ammonium and aryl ammonium and metals, including mixtures of the same. The hydrogen form may be prepared, for example, by substitution of original sodium with ammonium or by direct exchange with mineral acid. The composition is then calcined at a temperature of, say, 1000° F. causing evolution of ammonia and retention of hydrogen in the composition, i.e., hydrogen and/or decationized form. Of the replacing metals, preference is accorded to metals of Groups II, IV and VIII of the Periodic Table, preferably the rare earth metals.

The crystalline titanium silicates are then preferably washed with water and dried at a temperature ranging from 60° F. to about 800° F. and thereafter calcined in air or other inert gas at temperatures ranging from 500° F. to 1500° F. for periods of time ranging from 1 to 48 hours or more.

Regardless of the synthesized form of the titanium silicate, the spatial arrangement of atoms which form the basic crystal lattices remain essentially unchanged by the replacement or sodium or other alkali metal or by the presence in the initial reaction mixture of metals in addition to sodium, as determined by an X-ray powder diffraction pattern of the resulting titanium silicate. The X-ray diffraction patterns of such products are essentially the same as those set forth in Table 1 above.

The crystalline titanium silicates prepared in accordance with the invention are formed in a wide variety of particular sizes. Generally, the particles can be in the form of powder, a granule, or a molded product such as an extrudate having a particle size sufficient to pass through a 2 mesh (Tyler) screen and be maintained on a 400 mesh (Tyler) screen in cases where the catalyst is molded such as by extrusion. The titanium silicate can be extruded before drying or dried or partially dried and then extruded.

When used as a catalyst, it is desired to incorporate the new crystalline titanium silicate with another material resistant to the temperatures and other conditions employed in organic processes. Such materials include active and inactive materials and synthetic and naturally occurring zeolites as well as inorganic materials such as clays, silica and/or metal oxides, The latter may be either naturally occurring or in the form of gelatinous precipitates or gels including mixtures of silica and metal oxides. Use of a material in conjunction with the new crystalline titanium silicate, i.e., combined therewith which is active, tends to improve the conversion and/or selectivity of the catalyst in certain organic conversion processes. Inactive materials suitably serve as diluents to control the amount of conversion in a given process that the products can be obtained economically and in an orderly manner without employing other means for controlling the rate of reaction. Normally, crystalline materials have been incorporated into naturally occurring clays, e.g., bentonite and kaolin to improve the crush strength of the catalyst under commercial operating conditions. These materials, i.e., clays, oxides, etc., function as binders for the catalyst. It is desirable to provide a catalyst having good crush strength because in a petroleum refinery the catalyst is often subjected to rough handling which tends to break the catalyst down into powder-like materials which cause problems in processing. These clay binders have been employed for the purpose of improving the crush strength of the catalyst.

Naturally occurring clays that can be composited with the crystalline titanium silicate described herein include the smectite and kaolin families, which families include the montmorillonites such as sub-bentonites and the kaolins known commonly as Dixie, McNamee, Ga. and Florida or others in which the main constituent is halloysite, kaolinite, dickite, nacrite or anauxite. Such clays can be used in the raw state as originally mined or initially subjected to calcination, acid treatment or chemical modification.

In addition to the foregoing materials, the crystalline titanium silicate may be composited with matrix materials such as silica-alumina, silica-magnesia, silica-zirconia, silica-thoria, silica-berylis, silica-titania as well as ternary compositions such as silica-alumina-thoria, silica-alumina-zirconia, silica-alumina-magnesia and silica-magnesia-zirconia. The matrix can be in the form of a cogel. The relative proportions of finely divided crystalline metal organosilicate and inorganic oxide gel matrix can vary widely with the crystalline organosilicate content ranging from about 1 to 90 percent by weight and more usually in the range of about 2 to about 50 percent by weight of the composite.

As is known in the art, it is desirable to limit the alkali metal content of materials used for acid catalyzed reactions. This is usually accomplished by ion exchange with hydrogen ions or precursors thereof such as ammonium and/or metal cations such as rare earth.

Employing the catalyst of this invention, containing a hydrogenation component, heavy petroleum residual stocks, cycle stocks, and other hydrocrackable charge stocks can be hydrocracked at temperatures between 400° F. and 825° F. using molar ratios of hydrogen to hydrocarbon charge in the range between 2 and 80. The pressure employed will vary between 10 and 2,500 psig and the liquid hourly space velocity between 0.1 and 10.

Employing the catalyst of this invention for catalytic cracking, hydrocarbon cracking stocks can be cracked at a liquid hourly space velocity between about 0.5 and 50, a temperature between about 550° F. and 1100° F., a pressure between about subatmospheric and several hundred atmospheres.

Employing a catalytically active form of a member of the family of zeolites of this invention containing a hydrogenation component, reforming stocks can be reformed employing a temperature between 700° F. and 1000° F. The pressure can be between 100 and 1,000 psig, but is preferably between 200 to 700 psig. The liquid hourly space velocity is generally between 0.1 and 10, preferably between 0.5 and 4 and the hydrogen to hydrocarbon mole ratio is generally between 1 and 20, preferably between 4 and 12.

The catalyst can also be used for hydroisomerization of normal paraffins when provided with a hydrogenation component, e.g., platinum. Hydroisomerization is carried out at a temperature between 200° F. and 700° F., preferably 300° F. to 550° F., with a liquid hourly space velocity between 0.01 and 2, preferably between 0.25 and 0.50 employing hydrogen such that the hydrogen to hydrocarbon mole ratio is between 1:1 and 5:1. Additionally, the catalyst can be used for olefin isomerization employing temperatures between 30° F. and 500° F.

EXAMPLE 1

This example illustrates the current state of the art preparation of ETS-10. It is taken directly from pilot plant scale synthesis of ETS-10 for desiccant applications and involves several years of evolution of the methods described in U.S. Pat. No. 4,853,202.

An alkaline slurry was prepared by sequentially adding 384 lbs. of sodium silicate (28.8% $SiO_2$, 8.94% $Na_2O$), 108 lbs. of sodium hydroxide solution (38.9% $Na_2O$), 112 lbs. of potassium fluoride solution (32.4% $K_2O$), and 1.04 lbs. (dry weight) of ETS-10 seeds present as a slurry in roughly 4 lbs. of deionized water. The mixture in the stated order was blended and homogenized. A solution consisting of 232 lbs. of deionized water, 72.6 lbs. of concentrated hydrochloric acid (33.7% HCl), and 85.2 lbs. of titanium oxychloride solution (21.1% $TiO_2$, 35.8% HCl) was prepared. The slurry and the solution were mixed in roughly equal proportions through simultaneous addition to a 5 gallon bucket equipped with an overhead mixer stirring at 1700 rpm using a 4" Cowles high shear blade then pumped to a large holding tank. Throughout the mixing, a gel pH of 10.2±0.1 was typically maintained. The final pH of the fully mixed gel was 10.2±0.1. The gel was crystallized in a stirred 100 gallon titanium lined autoclave at 215° C. for 24 hours. The crystallized product was filtered and washed with deionized water.

The product was recovered and had the following X-ray diffraction data.

| D Spac (Ang.) | I/Imax (%) |
| --- | --- |
| 14.7552 | 24.37 |
| 7.1931 | 13.15 |
| 6.8268 | 1.69 |
| 4.9275 | 3.23 |
| 4.4055 | 27.05 |
| 4.2535 | 2.35 |
| 3.7318 | 3.58 |
| 3.5990 | 100.00 |
| 3.4461 | 24.68 |
| 3.3435 | 8.64 |
| 3.2735 | 22.23 |
| 3.1337 | 5.81 |
| 2.9811 | 11.16 |
| 2.8107 | 4.60 |
| 2.5372 | 11.02 |
| 2.5178 | 19.90 |
| 2.4612 | 10.19 |
| 2.4251 | 4.38 |
| 2.3550 | 5.61 |

Figure 1B:
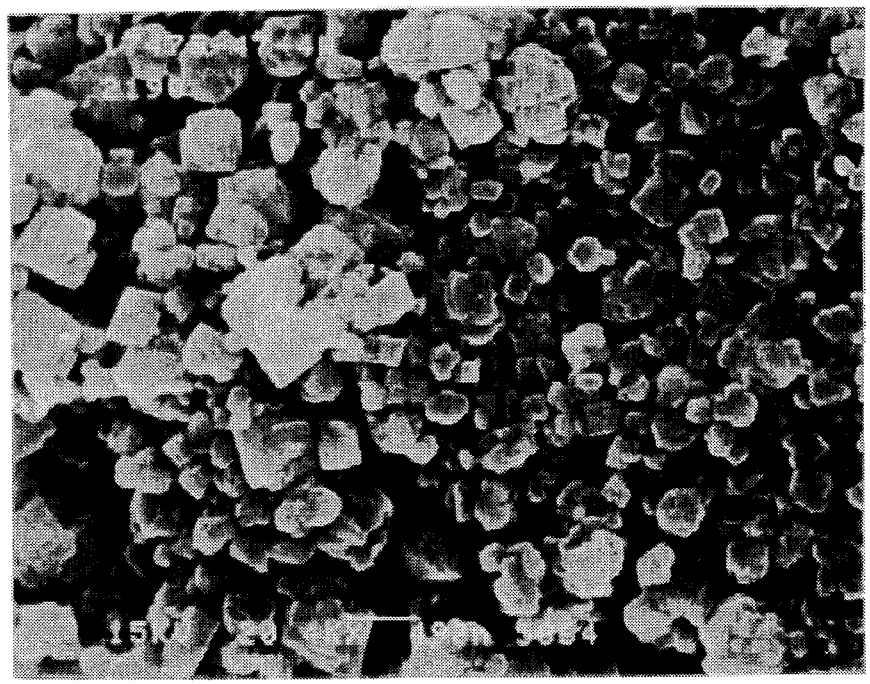

Scanning electron micrographs (SEM) are presented in FIGS. 1A and 1B.

EXAMPLE 2

This example demonstrates this invention.

An alkaline solution containing 330 grams of potassium hydroxide (85%) in 3250 grams of deionized water was prepared. To the solution was added 5512 grams of sodium silicate (28.8% $SiO_2$, 8.94% $Na_2O$) and 2000 grams of sodium hydroxide solution (38.9% $Na_2O$) and the mixture was blended until a clear solution resulted. An acidic solution containing 5000 grams of deionized water and 4305 grams of titanic sulfate (9.3% $TiO_2$, 37.8% $H_2SO_4$) was prepared and added to the base solution with stirring at 2500 rpm using an overhead mixer equipped with a high shear blade. The pH of the gel at this point was 11.0. The pH was lowered to 10.13 using sulfuric acid. Then 10 grams (dry weight) of ETS-10 seeds in 500 grams of deionized water were blended into the gel using the same overhead mixer. The final pH of this portion of the gel was 10.2±0.1. The gel at this point had a mass of 21.92 kg. A 17.00 kg portion of the gel was separated and 2000 grams of deionized water was added to this portion and stirred for 10 minutes using the overhead mixer. This portion of the gel was crystallized in a stirred 5 gallon autoclave at 225° C. for 24 hours. The crystallized product was filtered and washed with deionized water.

The crystalline product was washed and the product was recovered and had the following XRD data.

| D spac (Ang.) | I/Imax (%) |
| --- | --- |
| 14.6634 | 21.87 |
| 11.6459 | 6.04 |
| 8.8847 | 1.91 |
| 7.2063 | 11.38 |
| 6.8202 | 2.05 |
| 4.9295 | 3.32 |
| 4.4071 | 27.92 |
| 3.7376 | 3.03 |
| 3.6047 | 100.00 |
| 3.4478 | 28.34 |
| 3.2780 | 22.72 |
| 3.1382 | 7.43 |
| 2.9874 | 14.52 |
| 2.8890 | 4.04 |
| 2.8102 | 5.80 |
| 2.6742 | 2.41 |
| 2.5397 | 12.27 |
| 2.5202 | 20.14 |
| 2.4656 | 11.04 |

| D spac (Ang.) | I/Imax (%) |
|---|---|
| 2.4261 | 5.99 |
| 2.3554 | 7.11 |
| 2.2738 | 2.29 |

Figure 2A:
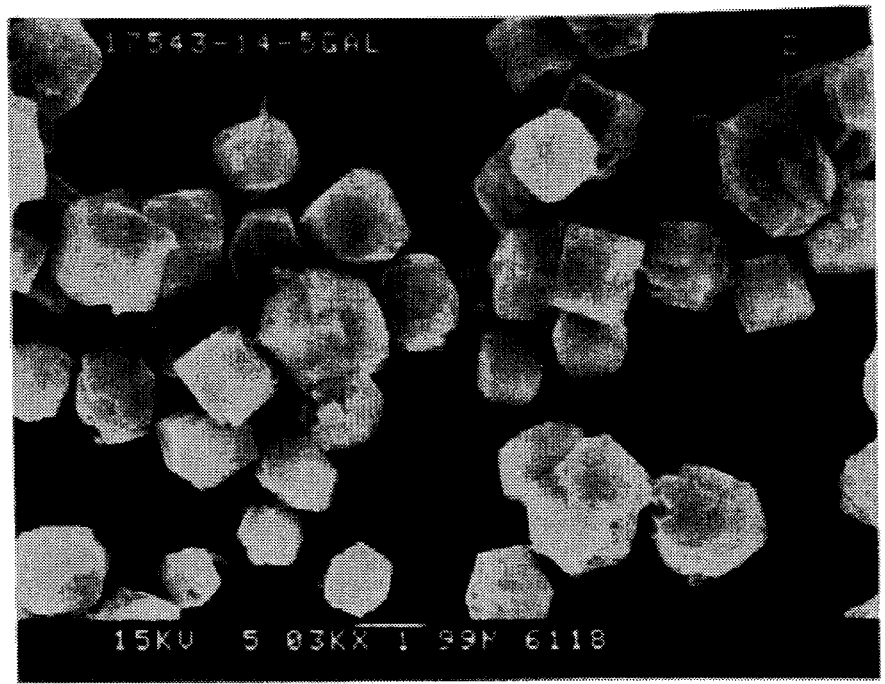
FIGS. 2A and 2B contain two scanning electron micrographs at two different magnifications of the product of Example 2.
Figure 2B:
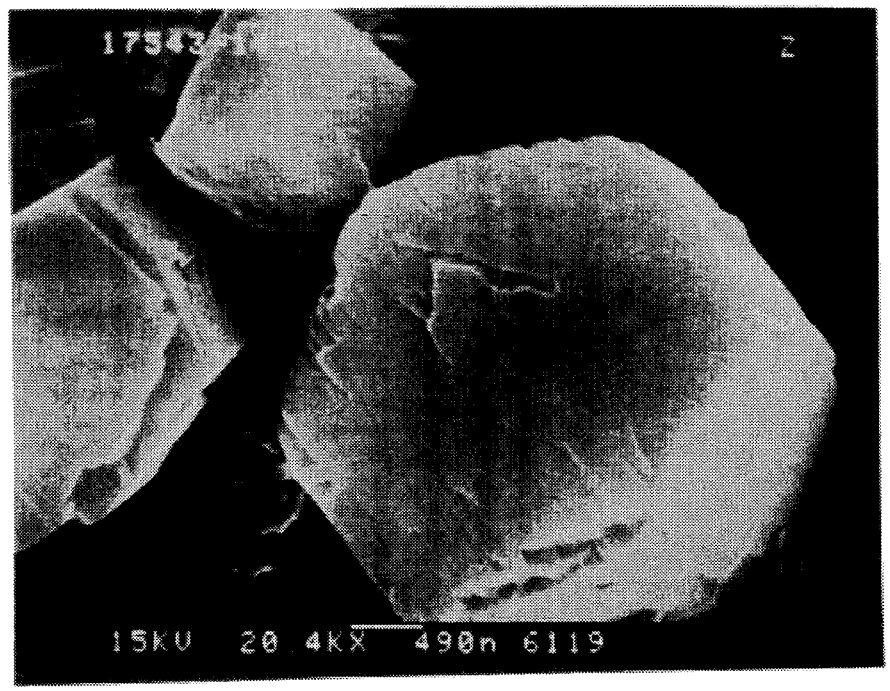

Scanning electron micrographs (SEM) are presented in FIGS. 2A and 2B.

As can be seen, the XRD data for the product of Example 1 and Example 2 are substantially identical and both resulted in the preparation of ETS-10.

The scanning electron microscopic images of the product in Examples 1 and 2 demonstrate the dramatic differences in uniformity of individual particles between samples.

FIGS. 1A and 1B illustrate the particle size of crystals of ETS-10 from Example 1 at 5.03 KX (FIG. 1A) and 20.4 KX (FIG. 1B) magnifications. FIGS. 2A and 2B illustrate the particle size of crystals of ETS-10 from Example 2 at 5.03 KX (FIG. 2A) and 20.4 (FIG. 2B) magnifications.

The product of Example 2 contains clean individual crystals of uniform morphology which are easily processed with substantially no loss during filtration.

The expression "uniform morphology" is intended to mean individual blocky crystals of uniform size and shape wherein any given preparation of crystals is characterized by a narrow Gaussian unimodal distribution with the mean crystal size for any given preparation being between 0.1–20 microns in its smallest dimension, e.g., as determined by microscopic evaluation.

What is claimed is:

1. A process for the preparation of molecular sieve ETS-10 which comprises preparing a halide-free reaction mixture containing a source of titanium, a source of silica, a source of alkali metal and water, said reaction mixture having a composition in terms of mole ratios falling within the following ranges:

| | |
|---|---|
| $SiO_2/Ti$ | 2–20 |
| $H_2O/SiO_2$ | 2–200 |
| $M_n/SiO_2$ | 0.05–10 | wherein M indicates cations of a valence n derived from alkali metal hydroxides and/or halide-free alkali metal salts, maintaining said reaction at a temperature of from about 100° C. to 300° C. for a period of time ranging from about 1 hour to 40 days at a pH of 8.5 to 12.0 and recovering said molecular sieve.

2. The process of claim 1 wherein the titanium source is titanic sulfate.

3. The process of claim 1 wherein M is a mixture of sodium and potassium.

4. The process of claim 1 wherein ETS-10 seeds are added to the reaction mixture.

5. The process of claim 1 wherein the reaction mixture has a composition in terms of mole ratios falling within the following ranges:

| | |
|---|---|
| $SiO_2/Ti$ | 3–10 |
| $H_2O/SiO_2$ | 5–100 |
| $M_n/SiO_2$ | 0.2–5. |

6. The process of claim 1 wherein the reaction mixture has a composition in terms of mole ratios falling within the following ranges:

| | |
|---|---|
| $SiO_2/Ti$ | 4–7 |
| $H_2O/SiO_2$ | 10–50 |
| $M_n/SiO_2$ | 0.5–3. |

7. A titanium-silicate molecular sieve having the X-ray diffraction lines set forth in Table 1 and characterized by crystals which have a uniform morphology.

* * * * *